(12) United States Patent
Oosawa

(10) Patent No.: US 6,708,105 B2
(45) Date of Patent: Mar. 16, 2004

(54) ENGINE CONTROL APPARATUS WITH MODE CHANGEOVER FUNCTION

(75) Inventor: Toshio Oosawa, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/197,571

(22) Filed: Jul. 18, 2002

(65) Prior Publication Data

US 2003/0149523 A1 Aug. 7, 2003

(30) Foreign Application Priority Data

Feb. 6, 2002 (JP) .................................... 2002-029135

(51) Int. Cl.[7] .............................................. F02D 45/00
(52) U.S. Cl. ...................................................... 701/114
(58) Field of Search ................................ 701/114, 115, 701/102

(56) References Cited

U.S. PATENT DOCUMENTS 4,910,494 A * 3/1990 Tamai ......................... 701/114

FOREIGN PATENT DOCUMENTS

| JP | 3-210052 | 9/1991 | | |
|----|----------|--------|---|---|
| JP | 2556916 | 9/1996 | | |
| JP | 2000-341196 A | * 12/2000 | ............ | H04B/7/26 |

* cited by examiner

Primary Examiner—Hieu T. Vo
(74) Attorney, Agent, or Firm—Sughrue Mion, PLLC

(57) ABSTRACT

An engine control apparatus with a mode changeover function for transition to a fault diagnosis mode and fault decision display without using dedicated fault diagnosis input/output unit includes plural input terminals connected to plural input units (2, 3, 4), respectively, and plural output terminals connected to plural corresponding display devices (7, 8, 9), respectively. The apparatus is designed to fetch input information from the input units (2, 3, 4) to thereby drive the display devices (7, 8, 9) and change over control modes in response to external input information. A removable short-circuit line (10) is provided for forming a short-circuit selectively between a predetermined one of the plural output terminals and a predetermined one of the plural input terminals. A mode changeover decision unit decides the control mode changeover when the short-circuit is formed.

2 Claims, 4 Drawing Sheets

ENGINE CONTROL APPARATUS WITH MODE CHANGEOVER FUNCTION

This application is based on Application No. 2002-029135, filed in Japan on Feb. 6, 2002, the contents of which are hereby incorporated by reference.

BACKGROUND OF THE INVENTION

1. Field of the Invention

The present invention generally relates to an engine control apparatus having a mode changeover function for performing diagnosis as to a fail or fault state in the preceding operation of an engine before starting the engine operation. More particularly, the invention is concerned with an engine control apparatus with a mode changeover function which apparatus can be realized in a small size at a low cost with a simplified circuit configuration while ensuring high reliability.

2. Description of Related Art

In general, the engine control apparatus is imparted with a function for checking or diagnosing an engine as to fail or fault and storing the result of the diagnosis so that upon power-up for starting the engine for the succeeding operation, operator or driver can check again the result of the diagnosis by activating a fault diagnosis mode.

For better understanding of the present invention, technical background thereof will be briefly reviewed below. FIG. 4 of the accompanying drawings is a circuit diagram showing schematically and generally a conventional engine control apparatus imparted with a mode changeover function (or fault diagnosis function, to say in another way) known heretofore which is disclosed, for example, in Japanese Patent Application Laid-Open Publication No. 210052/1991 (Japanese Patent No. 2556916).

Referring to FIG. 4, the engine (not shown) is provided with a fault diagnosis input unit 1 for validating the fault diagnosis mode, an overheat input unit 2, an oil-level input unit 3 and an idle input unit 4 which are comprised of input switches responsive to various engine fault or fail state, respectively.

Output terminals of the various input units 1 to 4 mentioned above are connected to input terminals, respectively, of an engine control apparatus 5 which incorporates therein a microcomputer or microprocessor and others. The fault diagnosis input unit 1 is turned on by a driver upon power-up of the engine system, whereby an input signal is inputted to the engine control apparatus 5 as a mode changeover command for validating or activating the fault or fail diagnosis mode.

On the other hand, the other input units 2 to 4 are so designed as to be set to "ON" state in response to driving signals outputted from various fault detecting units (not shown) upon occurrence of faults or fails in the engine system, whereby the input information indicative of occurrence of the fault is inputted to the engine control apparatus 5.

Connected to the output terminal of the engine control apparatus 5 are a fault diagnosis display device 6 indicating the fault diagnosis mode and an overheat display device 7, an oil-level display device 8 and an idle display device 9 indicating relevant fault states, respectively.

The various display devices 6 to 9 are provided in correspondence to the various input units 1 to 4, respectively. The display devices 6 to 9 are driven by the engine control apparatus 5 in response to the input signals from the corresponding input units to the idle input unit 4, respectively. Further, the display devices 6 to 9 driven by the engine control apparatus 5 serve as external loads of the engine control apparatus.

The fault diagnosis input unit 1 and the fault diagnosis display device 6 are provided separately and independently from an input/output unit(s) designed for the ordinary control purpose. The fault diagnosis input unit 1 is equipped with an switch which can externally be manipulated by a driver or other operator.

Next, description will be made of operation of the conventional engine control apparatus imparted with the mode changeover function shown in FIG. 4.

When the fault diagnosis input unit 1 is turned on upon power-up of the engine system with the engine fault diagnosis signal being inputted, then the engine control apparatus 5 makes decision that the fault diagnosis mode is validated, whereupon the engine control apparatus 5 executes the fault diagnosing operation.

More specifically, the fault diagnosis input unit 1 responds to the turn-on operation to thereby drive the fault diagnosis display device 6. Additionally, when a fault has taken place in the preceding operation, the engine control apparatus 5 drives a corresponding one of the display devices 7 to 9 to thereby display the fault-suffering location in the engine system.

By way of example, when overheat abnormality, oil level abnormality, idle abnormality or the like is stored, corresponding one of the overheat display device 7, the oil-level display device 8 and the idle display device 9 is driven. In this manner, the engine starting operation from the fault or fail state can be evaded.

As is apparent from the above, the conventional engine control apparatus imparted with the mode changeover function is provided with the fault diagnosis input unit 1 for validating the fault diagnosis mode and the fault diagnosis display device 6. Thus, because of the presence of the fault diagnosis input unit 1 and the fault diagnosis display device 6, great difficulty will be encountered in implementing the engine control apparatus imparted with the mode changeover function in a small or miniature size at a low cost.

Furthermore, when a fail event (or fault such as opening, grounding, short-circuiting or the like) should occur in the input switch of the fault diagnosis input unit 1, it becomes impossible to validate or make transition to the fault diagnosis mode or inversely the fault diagnosis mode is fixedly held, making it impossible to restore the ordinary mode from the fault diagnosis mode.

Additionally, when all the input units 2 to 4 are turned on to thereby validate the fault diagnosis mode, there arises a problem that the state in which al the faults have occurred can not discriminatively be identified.

SUMMARY OF THE INVENTION

In the light of the state of the art described above, it is an object of the present invention to provide an engine control apparatus imparted with a mode changeover function, which apparatus can be realized in a small size at a low cost by rendering it unnecessary to provide a dedicated fault diagnosis input/output unit while ensuring validation of a fault diagnosis mode as well as a fault decision display without fail.

In view of the above and other objects which will become apparent as the description proceeds, there is provided according to an aspect of the present invention an engine control apparatus imparted with a mode changeover function, which apparatus includes a plurality of input terminals connected to a plurality of input units, respectively, and a plurality of output terminals connected to a plurality of display devices in correspondence to the plurality of input units, respectively. The engine control apparatus is designed to fetch input information from the plurality of input units to thereby drive the plurality of display devices and change over the control mode in response to external input information. The engine control apparatus includes a removable short-circuit line for forming a short-circuit selectively between a predetermined one of the plural output terminals and a predetermined one of the plural input terminals, and a mode changeover decision means for deciding that the control mode changeover state is validated when the short-circuit is formed between the predetermined output terminal and the predetermined input terminal by means of the short-circuit line.

In a preferred mode for carrying out the invention, the mode changeover decision means may be so designed as to execute the steps of outputting a pulse signal of a predetermined period from the predetermined output terminal upon power-up, comparing the input signal from the predetermined input terminal with ON/OFF levels of the pulse signal a predetermined number of times, and deciding that the control mode changeover state is validated when the input signal from the predetermined input terminal is in synchronism with the ON/OFF levels of the pulse signal over the predetermined number of times, while deciding an ordinary state unless the input signal from said predetermined input terminal is in synchronism with the ON/OFF levels of the pulse signal over the predetermined number of times.

With the arrangement of the engine control apparatus, it is possible to validate the fault diagnosis mode and generate a fault decision display without need for providing any dedicated fault diagnosis input/output unit.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

The present invention will be described in detail in conjunction with what is presently considered as preferred or typical embodiments thereof by reference to the drawings.

Embodiment 1

Figure 1:
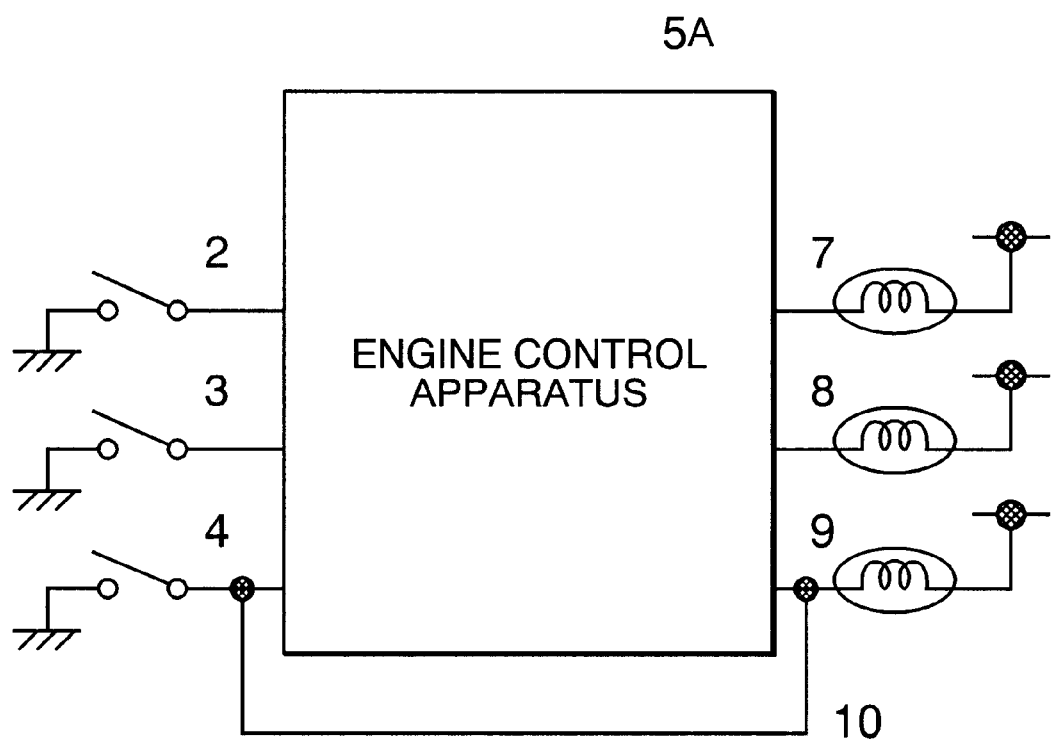
FIG. 1 is a circuit diagram showing schematically a circuit configuration of an engine control apparatus imparted with a mode changeover function according to a first embodiment of the present invention.
Figure 2:
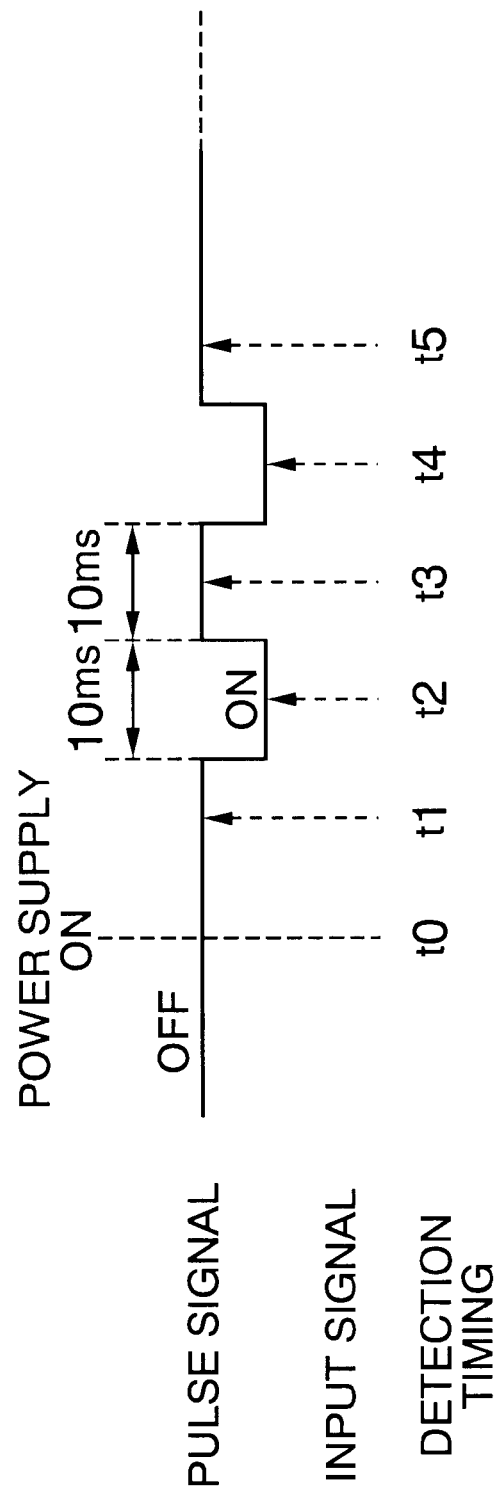
FIG. 2 is a timing chart for illustrating mode changeover processing operation in the engine control apparatus imparted with the mode changeover function according to the first embodiment of the invention.

FIG. 1 is a circuit diagram showing schematically a circuit configuration of an engine control apparatus which is imparted with a mode changeover function according to a first embodiment of the present invention, and FIG. 2 is a timing chart for illustrating mode changeover processing operation performed in the engine control apparatus according to the first embodiment of the invention.

Figure 4:
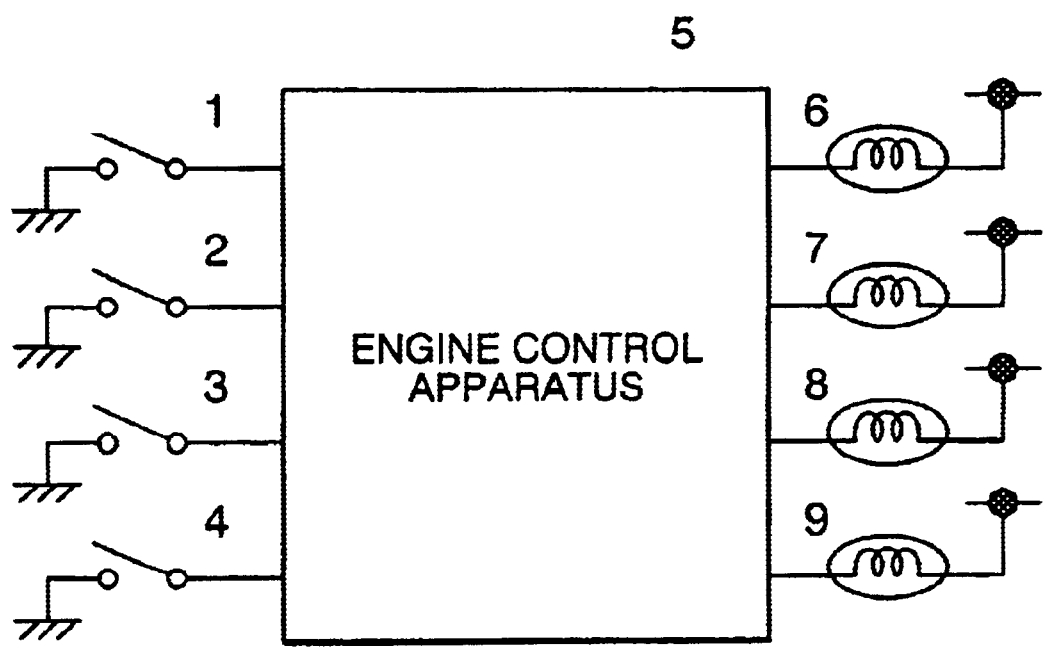
FIG. 4 is a circuit diagram showing schematically a conventional engine control apparatus imparted with a mode changeover function known heretofore.

In FIG. 1, components or units same as or equivalent to those described hereinbefore by reference to FIG. 4 are denoted by like reference symbols and repeated description thereof is omitted.

Referring to FIG. 1, connected to an engine control apparatus 5A are only individual input units 2 to 4 and display devices 7 to 9 associated with the input units 2 to 4, respectively. In other words, the fault diagnosis input unit 1 and the fault diagnosis display device 6 described hereinbefore by reference to FIG. 4 are spared.

Further, the idle input unit 4 and the idle display device 9 are so arranged that they can be short-circuited by a short-circuit line 10 having a removable connector (not shown) upon mode changeover.

More specifically, when an operator or driver desires to validate or activate the fault diagnosis mode upon power-up, short-circuit is formed between the idle input unit 4 and the idle display device 9 by means of the short-circuit line 10.

Further, the engine control apparatus 5A is so designed as to output a predetermined number of ON/OFF pulse signals (see FIG. 2) from the output terminal for the idle display device 9 upon power-up while checking a signal level Vi(N) detected from the input terminal for the idle input unit 4 at a plurality of timings or time points tN (N=1, 2, . . . , 5), as described later on.

Additionally, the engine control apparatus 5A is designed such that when the connected state of the short-circuit line 10 is decided on the basis of the result of the signal level check at the plural time points, the results of the preceding fault diagnosis are displayed on the relevant display devices 7 to 9 while inhibiting the start of the engine operation.

In the foregoing, it has been described that the short-circuit is formed between the idle input unit 4 and the idle display device 9 upon validation of the fault diagnosis mode. It should however be understood that such short-circuit may be formed between any one of the input units 2 to 4 and a corresponding one of the display devices 7 to 9 essentially to the same effect.

In this conjunction, it goes without saying that the idle display device 9 is driven in response to the fault information obtained from the idle input unit 4 in the ordinary state where no short-circuit is formed between the idle input unit 4 and the idle display device 9.

Next, referring to FIG. 2, description will be directed to operation of the engine control apparatus imparted with the mode changeover function according to the first embodiment of the invention shown in FIG. 1.

In FIG. 2, at a time point (timing) to, power supply to the engine control apparatus 5A is turned on. At time points t1 to t5 which succeed to the time point to, signal check is performed by the engine control apparatus 5A in the power-up mode.

When the engine state is to be checked by validating the fault diagnosis mode upon power-up, a short-circuit is established or formed at the time point to between the idle input unit 4 and the idle display device 9 by means of the short-circuit line 10.

When electric power is supplied to the engine control apparatus 5A in this state, the engine control apparatus 5A outputs from an output terminal for the idle display device 9 a pulse signal in which ON and OFF levels repeat alternately, as illustrated in FIG. 2.

At this time point, the output signal of the engine control apparatus 5A changes between an ON-level (L-level) and an OFF-level (H-level) e.g. at every 10 msec. Further, in synchronism with the level change, the engine control apparatus 5A detects the input level of the idle input unit 4 N times at the time points t1, . . . , t5, respectively.

More specifically, at the time point t0 at which the power supply is started, the engine control apparatus 5A outputs the pulse signal containing short pulses of repetitive ON- and OFF-levels from the output terminal for the idle display device 9, whereby the pulse signal is supplied to the idle display device 9. On the other hand, the input information is fetched from the idle input unit 4 for the level detection at the time point t1 before the succeeding inverted pulse is outputted.

Subsequently, the engine control apparatus 5A executes repetitionally the similar detecting operation every 10 msec, to thereby perform level detection on the input information from the idle input unit 4 at the time points t2, . . . , t5.

In succession, the engine control apparatus 5A compares the signal levels (output information for the idle display device 9) outputted at five time points mentioned above with the signal levels (input information from the idle input unit 4) detected at the corresponding time points t1, . . . , t5.

When coincidence is found in all the results of the comparisons or decisions performed five times, the engine control apparatus 5A determines that "fault decision display mode" is validated, the state in which the short-circuit line 10 is connected (or the changeover to the fault diagnosis mode has been requested), whereon the engine control apparatus 5A drives the display devices 7, 8 and 9 in dependence on the preceding fault state(s).

In other words, the overheat display device 7 or the oil-level display device 8 is made use of as the fault decision code output unit for displaying, for example, the preceding fault state on the basis of the code output.

Figure 3:
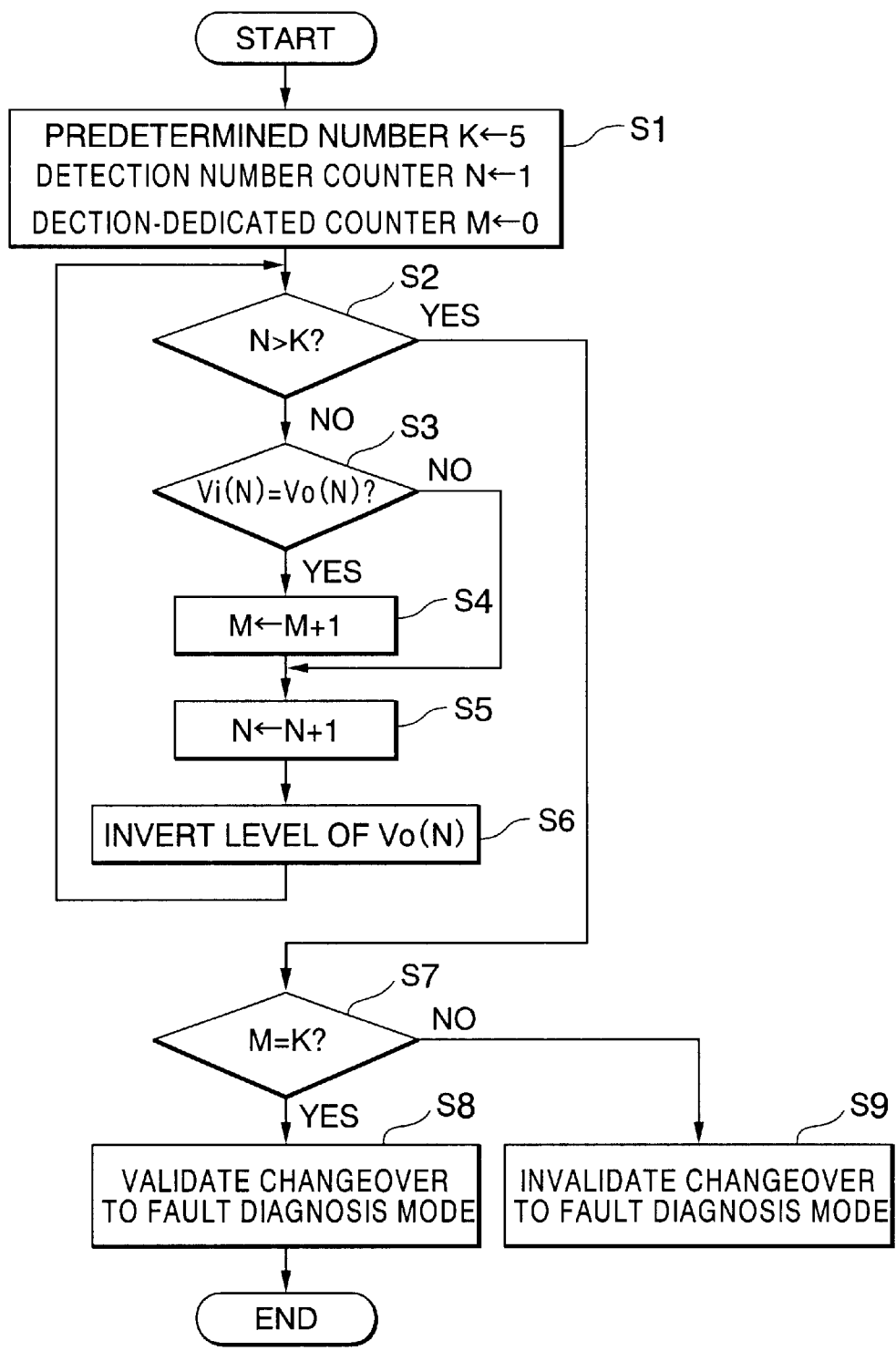
FIG. 3 is a flow chart for illustrating a processing procedure for mode changeover performed by the engine control apparatus according to the first embodiment of the invention.

FIG. 3 is a flow chart for illustrating a processing procedure for the mode changeover decision operation executed by the engine control apparatus 5A.

Referring to FIG. 3, at first, a predetermined number K (=five times) is initially set while a value of a detection times counter N and that of a decision-dedicated counter M are cleared to zero "0", respectively (step S1).

Next, it is decided whether or not the value of the detection times counter N exceeds the predetermined number K (step S2). When it is decided that the value of the detection times counter N is smaller than the predetermined number K inclusive (i.e., when the decision step S2 results in negation "NO"), then decision is succeedingly made as to whether or not an output signal level Vo(N) coincides with a signal detection level Vi(N) at the time point tN (step S3).

When it is decided in the step S3 that Vi(N)=Vo(N) (i.e., when the decision step S3 results in affirmation "YES"), the value of the decision-dedicated counter M is incremented by one (step S4) with the value of the detection times counter N being incremented by one (step S5). On the other hand, when it is decided in the step S3 that Vi(N)≠Vo(N) (i.e., when the decision step S3 results in negation "NO"), the value of the detection times counter N is incremented in the step S5 without executing the processing step S4.

In succession, the polarity of the output signal level Vo(N) is inverted (step S6), whereon the step S2 is resumed to execute repetitionally the above-mentioned decision processing (steps S2 and S3), the counter increment processing (steps S4 and S5) and the output level inversion processing (step S6).

On the other hand, when it is decided in the step S2 that N>K (i.e., when the decision step S2 results in "YES"), this means that the signal level detecting processing has been executed the predetermined number K of times (=five times). Accordingly, it is then decided whether the value of the decision-dedicated counter M coincides with the predetermined number K (step S7).

When it is decided in the step S7 that M=K (i.e., when the decision step S7 results in "YES"), this means that interconnection between the input and output terminals of the engine control apparatus 5A by the short-circuit line 10 is ascertained. Accordingly, changeover to the fault diagnosis mode is validated (step S8), whereupon the processing routine illustrated in FIG. 3 comes to an end.

On the other hand, when it is decided in the step S7 that M<K (i.e., when the decision step S7 results in "NO"), this means that interconnection between the input and output terminals of the engine control apparatus 5A by the short-circuit line 10 can not be ascertained. Accordingly, changeover to the fault diagnosis mode is invalidated (step S9), whereupon the processing routine illustrated in FIG. 3 comes to an end.

In this manner, the engine control apparatus 5A is so designed as to decide the mode changeover requesting state for the fault diagnosis when the signal detection level Vi(N) at the input terminal from the idle input unit 4 coincides with the output signal level Vo(N) at the output terminal for the idle display device 9 N times in all the N decision processings.

Subsequently, the engine control apparatus 5A makes use of the output device such as the overheat display device 7 or the oil-level display device 8 as the fault decision code output device to generate the code output display.

Further, in the case where it is decided in the step S7 that M<K (the number N of times coincidence has been found in the N decision processings is smaller than N), this means that the input/output terminals are opened (i.e., the ordinary mode prevails), indicating that the mode changeover state is not validated. Accordingly, the oil-level display device 8 does not output for display the fault decision code but functions as the ordinary oil-level display output device.

At this junction, it should be added that although it has been described that the output terminal for the idle display device 9 and the input terminal for the idle input unit 4 are short-circuited upon making decision as to changeover to the fault diagnosis mode, it goes without saying that the input/output terminals for the other input unit and display device may be short-circuited substantially to the similar or equivalent effect.

By way of example, input/output terminals of given ones of the input units 2, . . . , 4 for inputting signals corresponding to various states and the corresponding display devices 7, . . . , 9 may be short-circuited, and validation of the fault decision mode may then be decided when the output signal (ON/OFF signal) of the display device is detected synchronously with the input signal from the input unit to thereby cause the other display device to display the fault suffering location.

Furthermore, such arrangement may equally be adopted that the microcomputer incorporated in the engine control apparatus 5A outputs the ON/OFF output signal while detecting synchronism with the input information from the input unit, wherein only when coincidence is found between both the signals, it is then decided that the changeover state to the fault diagnosis mode is to be validated, for displaying the fault code by making use of the ordinary display device.

As is apparent from the foregoings, according to the teachings of the present invention incarnated in the illustrated embodiments, the fault suffering location can easily be displayed without any need for providing the fault diagnosis dedicated input/output units (e.g. the fault diagnosis input unit 1 and the fault diagnosis display device 6 shown in FIG. 4).

By sparing the dedicated input/output units as mentioned above, the engine control apparatus 5A can be implemented in a small size at a low cost. Additionally, even if fail or fault (such as opening, grounding, short-circuiting or the like) should occur in the individual input units 2 to 4, erroneous mode decision can be evaded. Thus, the engine control apparatus which enjoys high reliability based on high trustworthiness of the mode decision can be realized.

Further, the number of times for the synchronism decision between the mode decision-dedicated output signal (ON/OFF signal) and the input signal through the medium of the short-circuit line 10 is never limited to five but may be set to a desired number as occasion requires, needless to say.

As is apparent from the foregoing, there has been provided according to the present invention the engine control apparatus imparted with the mode changeover function, which apparatus includes a plurality of input terminals connected to a plurality of input units, respectively, and a plurality of output terminals connected to a plurality of display devices corresponding to the plurality of input units, respectively, and which is designed to fetch input information from the plurality of input units to thereby activate the plurality of display devices. For realizing the mode changeover function, the engine control apparatus includes a removable short-circuit line for forming a short-circuit selectively between a predetermined one of the plural output terminals and a predetermined one of the plural input terminals, and a mode changeover decision means for deciding that the control mode changeover state is validated when the short-circuit is formed between the predetermined output terminal and the predetermined input terminal by means of the short-circuit line.

In this conjunction, the mode changeover decision means is so designed as to output a pulse signal of a predetermined period from the predetermined output terminal when power supply to the apparatus is started, compare the input signal from the predetermined input terminal with ON/OFF levels of the pulse signal a predetermined number of times and decide that the control mode changeover is validated when the input signals from the predetermined input terminal are detected in synchronism with the ON/OFF levels of the pulse signal over said predetermined number of times while deciding an ordinary state unless the input signal from the predetermined input terminal are in synchronism with the ON/OFF levels of the pulse signal over the predetermined number of times.

With the arrangement of the engine control apparatus, it is possible to validate the fault diagnosis mode and generate the fault decision display without fail while sparing any fault diagnosis input/output unit dedicated to this end. Thus, the engine control apparatus can be manufactured in a small size at a low cost.

Many modifications and variations of the present invention are possible in the light of the above techniques. It is therefore to be understood that within the scope of the appended claims, the invention may be practiced otherwise than as specifically described.

What is claimed is:

1. An engine control apparatus with a mode changeover function, including a plurality of input terminals connected to a plurality of input units, respectively, and a plurality of output terminals connected to a plurality of display devices corresponding to said plurality of input units, respectively, wherein said engine control apparatus is designed to fetch input information from said plurality of input units to thereby drive said plurality of display devices and imparted with a mode changeover function for changing over control modes in response to external input information, said engine control apparatus comprising:
 a removable short-circuit line for forming a short-circuit selectively between a predetermined one of said plural output terminals and a predetermined one of said plural input terminals; and
 mode changeover decision means for deciding that the control mode changeover state is validated when the short-circuit is formed between said predetermined output terminal and said predetermined input terminal by means of said short-circuit line.

2. An engine control apparatus with a mode changeover function according to claim 1, wherein said mode changeover decision means is designed to execute the steps of:
 outputting a pulse signal of a predetermined period from said predetermined output terminal when power supply to said engine control apparatus is started;
 comparing the input signal from said predetermined input terminal with ON/OFF levels of said pulse signal a predetermined number of times;
 deciding that said control mode changeover is validated when the input signal from said predetermined input terminal is in synchronism with the ON/OFF levels of said pulse signal over said predetermined number of times; and
 deciding an ordinary state unless the input signal from said predetermined input terminal is in synchronism with the ON/OFF levels of said pulse signal over said predetermined number of times.

* * * * *